(12) United States Patent
Avni et al.

(10) Patent No.: US 11,546,615 B2
(45) Date of Patent: Jan. 3, 2023

(54) PACKETIZED DATA COMMUNICATION OVER MULTIPLE UNRELIABLE CHANNELS

(71) Applicant: ZIXI, LLC, Waltham, MA (US)

(72) Inventors: Uri Avni, Waltham, MA (US); Israel Drori, Waltham, MA (US)

(73) Assignee: ZIXI, LLC, Waltham, MA (US)

( * ) Notice: Subject to any disclaimer, the term of this patent is extended or adjusted under 35 U.S.C. 154(b) by 380 days.

(21) Appl. No.: 16/699,786

(22) Filed: Dec. 2, 2019

(65) Prior Publication Data

US 2020/0128261 A1   Apr. 23, 2020

Related U.S. Application Data

(63) Continuation-in-part of application No. 16/359,016, filed on Mar. 20, 2019, now abandoned.

(60) Provisional application No. 62/646,428, filed on Mar. 22, 2018.

(51) Int. Cl.
| | |
|---|---|
| *H04N 7/12* | (2006.01) |
| *H04N 19/184* | (2014.01) |
| *H04N 19/126* | (2014.01) |
| *H04N 19/64* | (2014.01) |
| *H04L 65/611* | (2022.01) |

(52) U.S. Cl.
CPC ......... *H04N 19/184* (2014.11); *H04L 65/611* (2022.05); *H04N 19/126* (2014.11); *H04N 19/64* (2014.11)

(58) Field of Classification Search
CPC ....................................................... H04N 19/64
See application file for complete search history.

(56) References Cited

U.S. PATENT DOCUMENTS

| | | |
|---|---|---|
| 8,375,266 B2 | 2/2013 | Zhang |
| 8,775,889 B2 | 7/2014 | Zhang |
| 2008/0069016 A1 | 3/2008 | Cao et al. |
| 2009/0010152 A1 | 1/2009 | Ofek |
| 2016/0337723 A1 | 11/2016 | Graves |

*Primary Examiner* — Y Lee
(74) *Attorney, Agent, or Firm* — The Roy Gross Law Firm, LLC; Roy Gross

(57) ABSTRACT

A method comprising: receiving a plurality of duplicates of a serial bit stream, wherein said serial bit stream comprises a sequence of data packets; continuously dividing each of said duplicates of said serial bit stream based on sequential time windows; with respect to each of said time windows, aligning said data packets associated with each of said duplicates of said serial bit stream, received within said time window, based, at least in part, on data packet similarity; and recreating in real time said serial bit stream by selecting at least one of said aligned data packets as representing a next data packet in said sequence of data packets.

17 Claims, 2 Drawing Sheets

PACKETIZED DATA COMMUNICATION OVER MULTIPLE UNRELIABLE CHANNELS

CROSS REFERENCE TO RELATED APPLICATIONS

This application is a continuation-in-part of U.S. patent application Ser. No. 16/359,016, filed on Mar. 20, 2019, entitled "SYSTEM AND METHOD FOR COMMUNICATING DATA", the contents of which are incorporated by reference herein in their entirety.

FIELD OF THE INVENTION

The present invention relates generally to data communication. More specifically, the present invention relates to using several unreliable communication channels for communicating data.

BACKGROUND OF THE INVENTION

When sending data over packetized networks, some packets may be dropped, or they may arrive corrupted. Generally, a packetized network or channel may relate to dividing content to be sent into packets or messages, sending the packets or messages and reconstructing the content, by the receiving end, based on the packets.

To overcome loss or corruption of packets, some known systems and methods send some or even all packets more than once. However, sending the same data more than once is generally a wasteful method to overcome errors. Other methods, e.g., forward error correction (FEC) enable detecting a limited number of errors and may further enable a receiver to correct some of the errors, however, such methods come with a cost of increased computation resources and sender complexity.

Both stream duplication and FEC methods associate sequence numbers or other identifiers with packets and use the identifiers to reconstruct a stream of packets according the right (or original) order or sequence. However, such methods are inadequate when packets are not numbered or sequenced.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a method comprising: receiving a plurality of duplicates of a serial bit stream, wherein said serial bit stream comprises a sequence of data packets; continuously dividing each of said duplicates of said serial bit stream based on sequential time windows; with respect to each of said time windows, aligning said data packets associated with each of said duplicates of said serial bit stream, received within said time window, based, at least in part, on data packet similarity; and recreating in real time said serial bit stream by selecting at least one of said aligned data packets as representing a next data packet in said sequence of data packets.

There is also provided, in an embodiment, a system comprising at least one hardware processor; and a non-transitory computer-readable storage medium having program code embodied therewith, the program code executable by said at least one hardware processor to: receive a plurality of duplicates of a serial bit stream, wherein said serial bit stream comprises a sequence of data packets, continuously divide each of said duplicates of said serial bit stream based on sequential time windows, with respect to each of said time windows, align said data packets associated with each of said duplicates of said serial bit stream, received within said time window, based, at least in part, on data packet similarity, and recreate in real time said serial bit stream by selecting at least one of said aligned data packets as representing a next data packet in said sequence of data packets.

There is further provided, in an embodiment, a computer program product comprising a non-transitory computer-readable storage medium having program instructions embodied therewith, the program instructions executable by at least one hardware processor to: receive a plurality of duplicates of a serial bit stream, wherein said serial bit stream comprises a sequence of data packets; continuously divide each of said duplicates of said serial bit stream based on sequential time windows; with respect to each of said time windows, align said data packets associated with each of said duplicates of said serial bit stream, received within said time window, based, at least in part, on data packet similarity; and recreate in real time said serial bit stream by selecting at least one of said aligned data packets as representing a next data packet in said sequence of data packets.

The computer program product of claim 15, wherein each of said plurality of duplicates of said serial bit stream is transmitted over a different communication channel selected from the group consisting of: a private IP network, a public IP network, the internet, a global system for mobile communications (GSM) network, a local area network (LAN), a metropolitan area network (MAN), a wide area network (WAN), a wireless network, a satellite communication network, a cellular communication network, a Bluetooth communication channel, and a Wi-Fi network.

In some embodiments, each of the plurality of duplicates of said serial bit stream is transmitted over a different communication channel.

In some embodiments, each of the communication channels is selected from the group consisting of: a private IP network, a public IP network, the internet, a global system for mobile communications (GSM) network, a local area network (LAN), a metropolitan area network (MAN), a wide area network (WAN), a wireless network, a satellite communication network, a cellular communication network, a Bluetooth communication channel, and a Wi-Fi network.

In some embodiments, the aligning comprises arranging said data packets, received within a time window, in columns of an alignment score matrix, based, at least in part, on said data packet similarity, wherein each row in said matrix represents one of said duplicates of said serial bit stream.

In some embodiments, the method further comprises assigning, and the program instructions are further executable to assign, an alignment score to each of said columns based on one of data packet gaps and data packet mismatches in said column.

In some embodiments, with respect to each column of said matrix, the selecting is based, at least in part, on a consensus determined by data packet similarity of a majority of data packets in said column.

In some embodiments, the data packet similarity is determined based, at least in part, on a comparison of data packet content, wherein said data packet content is represented by a hash function.

In addition to the exemplary aspects and embodiments described above, further aspects and embodiments will become apparent by reference to the figures and by study of the following detailed description

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

Figure 1:
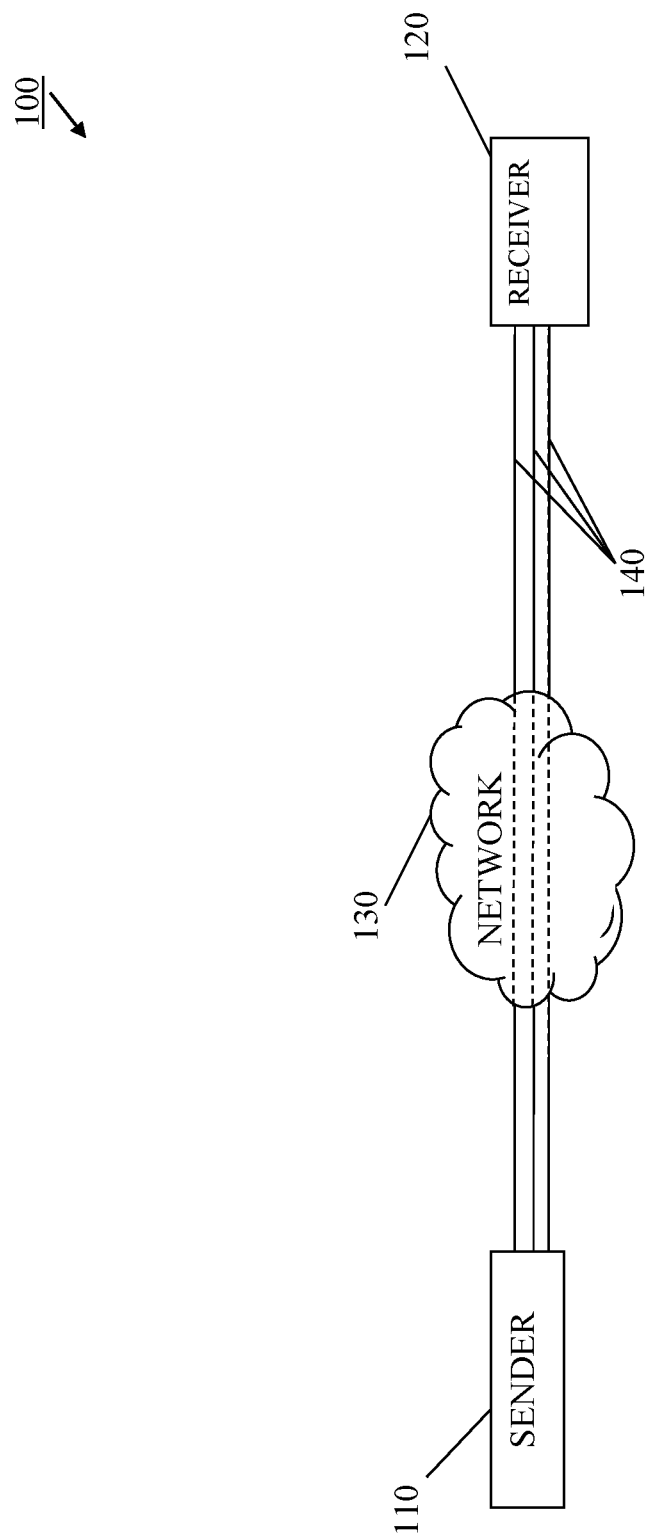
FIG. 1 shows a block diagram of a system according to illustrative embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Disclosed are a system, method, and computer program product for real-time error recovery in data streaming.

In some embodiments, the present disclosure provides for streaming serialized data streams, e.g., in the form of data packets, from a sender using two or more different communication routes or channels, and seamlessly reconstructing the data packets by a receiver from the duplicated received streams, to correct errors in any of the individual channels.

The present disclosure may be particularly useful in the area of packetized video streaming, e.g., MPEG transport stream over a noisy and/r lossy network, such as the Internet. Accordingly, in some embodiments, the present disclosure may provide for live broadcast-quality video over the Internet, with robust hitless failover capabilities.

In some embodiments, the multiple routes can be generated by replicated transmission channels over multiple communication channels. In some embodiments, multiple routes can be generated through multiple receiving units listening to a single transmission over a broadcasting medium, for example using multiple wireless receiving stations at different locations tuned to the same source signal.

In some embodiments, error recovery may be achieved by aligning data packets received over the several communication channels based, e.g., on time windows, arrival time, content, and/or another and/or similar methods for defining and/or synching and/or aligning data packets.

In some embodiments, data packet alignment includes arranging packets received over several channels, such that identical or similar packets are aligned.

In some embodiments, packet alignment may be used to overcome packet loss in one or more of the channels. For example, if no packet is present (or represented) in a first stream, but is present or represented in one or more other streams, then a receiver may determine that the packet was lost in the first stream, and may select for inclusion a packet as represented by other streams. Accordingly, e.g., when aligned, the third packet received from a first channel will be aligned with the third packet received from a second channel. If the third packet is missing in another channel, then the receiver may determine that this packet was lost in that channel, and select one of the corresponding third packets for inclusion in the reconstructed stream.

FIG. 1 illustrates an exemplary system 100 for real-time error recovery in data streaming, according to some embodiments of the present invention. As shown, data from a sender (or source) 110 may be sent, via network 130, over a number of communication channels 140 to receiver (or destination) 120. Sender 110 and receiver 120 may be any applicable computing device, e.g., a server, camera, smartphone or a home computer. It will be recognized that embodiments of the invention are not limited by the nature or type of sender or source 110 and/or by the nature or type of receiver or destination 120. For the sake of clarity and simplicity, only one sender 110 and one receiver 120 are shown, however, it will be understood that an embodiment may include any number of such nodes, e.g., a number of senders 110 may send data to receiver 120 over communication channels similar to communication channels 140. Communication channels 140 may be physical channels or routes (e.g., a route can be, or can include, wires, routers and the like) or they may be logical channels or routes (e.g., user datagram protocol (UDP) connections) or they may be a combination of physical and logical channels.

Network 130 may be, may comprise, or may be part of, a private or public IP network, or the internet, or a combination thereof. Additionally, or alternatively, network 130 may be, comprise or be part of, a global system for mobile communications (GSM) network. For example, network 130 may include or comprise an IP network such as the internet, a GSM related network and any equipment for bridging or otherwise connecting such networks as known in the art. Network 130 may be, may comprise or be part of a public or private data network, a local area network (LAN), a metropolitan area network (MAN), a wide area network (WAN), a wireline or wireless network, a satellite communication network, a cellular communication network, any combination of the preceding and/or any other suitable communication means. Accordingly, numerous elements of network 130 (e.g., access points, base stations, communication satellites, GPS satellites, routers and telephone switches) are implied but not shown. It will be recognized that embodiments of the invention are not limited by the nature or type of network 130.

An embodiment may provide error recovery by streaming, from a sender, data packets using two or more different routes or channels, and seamlessly reconstructing the data packets by a receiver. Generally, an original stream of packets (as sent by a sender, e.g., sender 110) is reconstructed by a receiver (e.g., receiver 120) based on multiple, duplicated received streams. It is noted that an embodiment can correctly reconstruct an original stream even when packet sequences numbers or other order information is not available.

The multiple routes can either be replicated transmission, or multiple receiving units listening to a single transmission over a broadcasting medium, for example using multiple wireless receiving stations at different locations tuned to the same source signal. As described, routes can be physical and/or logical routes.

In some embodiments, receiver 120 aligns packets according to time windows or time intervals. For example, streams of packets received from a plurality of channels in time intervals of, e.g., 50 milliseconds. Accordingly, packets received from, e.g., time interval 10:00:00:00 (HR:MIN:SEC:MILL) to 10:00:00:50 are aligned, then streams of packets received from the plurality of channels during time interval from 10:00:00:51 to 10:00:00:100 are aligned and so on. Any technique or mechanism for defining and/or synching time and/or time slots, intervals or windows may be used. Aligning packets in time-limited windows allow reconstructing the stream continuously in real time (vs. offline), and it reduces the computational complexity. Based on an alignment, the receiver selects the sequence of packets that is most likely the original sequence, as sent by a sender.

Generally, alignment, or sequence alignment as referred to herein, includes arranging packets received over several channels in a matrix, wherein each channel streaming is represented in a matrix row, such that identical or similar packets are aligned in separate matrix columns. For example, when aligned, the third packet (in the current time window) received from a first channel 140 is in the same column as the third packet received from a second channel 140. If the same packet appears, e.g., in two separate rows (each representing a respective channel), but is missing in a third row (representing a third channel), then the receiver may determine that the packet was lost or dropped in the third channel, and one of the packets appearing in the two other rows may be selected for inclusion in a reconstructed stream.

In some embodiments, the actual content of the packets may be used in an alignment process. For example, a hash or other function may be used to represent content of packets and an alignment may include checking whether or not packets in the same column have the same content, e.g., by comparing a hash value. For example, a packet for inclusion in a reconstructed stream may be selected based on a majority of rows that include the same content of a packet. For example, if it is determined (by receiver 120) that the content of a packet in column six in several rows (representing respective several streams) is the same and is different from the content of the packet in column six in a single row representing an additional stream, then the receiver may deduce that the packet in the additional stream was corrupted in transit and may be ignored. Thus, the receiver may select one of the packets in the six identical streams for inclusion in a reconstructed stream from anyone of the several streams.

An embodiment may use alignment as described to overcome packet loss. For example, if no packet is present (or represented) in a first row/column pair representing a first stream but packets are present or represented in the same column of one or more other streams then a receiver may determine that the packet was lost or dropped in the first stream and may select for inclusion a packet as represented by other streams.

In some embodiments, a receiver may use a scoring function and/or a threshold in the alignment process. For example, having arranged packets in a matrix as described, a scoring function may calculate a value for a time window based on gaps and/or based on content mismatch. For example, a gap may be an absence of a packet in a column as described and a mismatch may be different content in same column as described. In some embodiments, a scoring function and/or a threshold are used to determine whether or not an alignment of a set of packets of a respective set of streams is achieved.

Any scoring function, algorithm or logic may be used to align a set of packet sequences received from a respective set of streams or channels without departing from the scope of the invention. It will be understood that the specific algorithm discussed herein is just one example of an alignment algorithm that may be used.

In some embodiments, an alignment algorithm uses a packet similarity score for/when comparing the payload of two packets, and a score (or penalty) for inserting (or representing) a gap between packets. In some embodiments, the similarity function depends on the likelihood or probability of the source packets being identical given the observed packets' values, considering the probabilistic properties of the communication channel. For example, if the channels are erasure channels (dropped packets are possible, corrupted packets are not) the scoring function can be a scoring function returning 1 if the payloads of compared packets are identical, 0 when comparing packet and a gap (representing likelihood of packet loss), and minus infinity if the packets are dissimilar (representing likelihood of packet corruption impossibility). If packet bit flips (e.g., 0 becomes 1) are possible in the relevant channels, the packet similarity can depend on the Hamming distance between packet payloads, that is, how different is the payload of a first packet from the payload of a second packet.

For the sake of simplicity and clarity, a simplified case of aligning two sequences of packets received from two streams is described herein. Generally, a method for aligning packet sequences and determining or identifying the original (source) packet sequence arranges the two sequences one above the other in a way that maximizes a score function for an alignment of the sequences using a dynamic programming approach.

For example, for two sequences denoted $S_1$, $S_2$ of size (number of packets) $|S_1|$ and $|S_2|$, the method constructs a 2-dimensional matrix M of size $(|S_1|+1)*(|S_2|+1)$.

Assuming the similarity function is $\sigma$, and the penalty for inserting a gap of length x is $G_x$, the method initializes matrix M according to the formulas below:

$$M_{j,0} = -G_j, 0 \leq j \leq |S_1|$$

$$M_{0,j} = -G_j, 0 \leq j \leq |S_2|$$

Note that an initialization of matrix M as shown above includes the penalty of starting an alignment with a gap. The rest of the matrix cells are filled by selecting the maximal value between 3 previously calculated values as shown below:

$$M_{i,j} = \max \begin{cases} M_{i-1,j-1} + \sigma(S_1(i), S_2(j)), \\ \max_{1 \leq x \leq i} M_{i-x,j} - G_x, \\ \max_{1 \leq x \leq j} M_{i,j} - G_x \end{cases}$$

In the above, the first term calculates the score when matching packet $S_1(i)$ to packet $S_2(j)$, the second and third terms rely on previously calculated values, and represent the score when inserting a gap (dropped sequence of packets) of length x before $S_1(i)$ or $S_2(j)$, respectively.

With the maximal values as described, each $M_{i,j}$ cell in matrix M includes the optimal score of aligning subsets $S_1(1 \ldots i)$ with $S_2(1 \ldots j)$, and cell $M_{|S_1|,|S_2|}$ holds the optimal alignment score.

In some embodiments, constructing, identifying or choosing an alignment of packet sequences is done in reverse order, by backtracking the decisions that maximize the score at $M_{|S_1|,|S_2|}$. As known in the art, in a backtracking process, there can be multiple paths leading to the same maximal score. A method described herein can be used for identifying a path that yields a maximal score for M.

For example, in each backtracking step, a method records or finds the previous or last chosen cell that maximized the score in cell (i,j). For efficiency, a pointer to the previous or last cell that led to the maximal score can be stored in matrix cells in the construction stage.

Next, the two aligned sequences are constructed from the end to the beginning according to the following logic:

if matrix cell (i,j) is moved to matrix cell (i−1,j−1), packet $S_1(i)$ is added to the first aligned sequence, and packet $S_2(j)$ is added to the second aligned sequence.

if matrix cell (i,j) is moved to cell (i−x,j), packet $S_1(i)$ is added to the first sequence, and a gap of length x is added to the second sequence.

if matrix cell (i,j) is moved to cell (i,j−x), a gap of length x is added to the first sequence, and packet $S_2(j)$ is added to the second sequence. The process terminates when an edge of the matrix is reached.

The output of a backtracking process is two sequences of packets, one on top of the other, that may have gaps in some locations.

Aligning 3 or more sequences can be done in a similar way using a higher dimension matrix. Some improvements may be contemplated, for example, a faster approximate alignment can be achieved by iteratively aligning pairs of sequences.

The output of the alignment process described above is a consensus sequence between all sequences in the search window. To construct the consensus sequence, in each column of the alignment, a method selects the most likely packet by majority voting (or bitwise majority voting). As an example, assume packets are one byte long, and $\sigma$, $S_1$, $S_2$ and $G_x$ are as shown below:

$$\sigma(p, q) = \begin{cases} 1, p = q \\ -\infty, p \neq q \end{cases}$$

$$G_x = x$$

$$S_1 = A\ N\ T\ N\ A\ R\ I\ V$$

$$S_2 = N\ T\ A\ N\ A\ N\ A\ V\ O$$

In this exemplary case, since $G_x=x$, the score of inserting large gaps is equivalent to the score for inserting multiple small gaps. Accordingly, to calculate the scores in a back-tracking process as described, it is enough to consider the immediate neighboring cell to the left, to the top and diagonal top-left when filling the score matrix, and in the back-tracking process.

With respect to the above example, the score matrix, initialized and filled according to the dynamic programing logic described is as shown below:

|   | N | T | A | N | A | N | A | V | O |
|---|---|---|---|---|---|---|---|---|---|
|   | 0 | −1 | −2 | −3 | −4 | −5 | −6 | −7 | −8 | −9 |
| A | −1 | −2 | −3 | −1 | −2 | −2 | −3 | −3 | −4 | −5 |
| N | −2 | 0 | −1 | −2 | 0 | −1 | −1 | −2 | −3 | −4 |
| T | −3 | −1 | 1 | 0 | −1 | −2 | −2 | −3 | −4 | −5 |
| N | −4 | −1 | 0 | −1 | 1 | 0 | 0 | −1 | −2 | −3 |
| A | −5 | −2 | −2 | 1 | 0 | 2 | 1 | 1 | 0 | −1 |
| R | −6 | −3 | −2 | 0 | −1 | 1 | 0 | 0 | −1 | −2 |
| I | −7 | −4 | −3 | −1 | −2 | 0 | −1 | −1 | −2 | −3 |
| V | −8 | −5 | −4 | −2 | −3 | −1 | −2 | −2 | 0 | −1 |

Back-tracking from the last cell (value −1) requires moving to a cell above, to the left, or diagonally above and left, according to the path that maximizes the current cell score. Following the back-tracking process, the aligned sequences are generated from back to front and are as shown below:

```
A N T — N — N A R I V —
— N T A N A N A — — V O
```

Based on the aligned sequences, the reconstructed consensus sequence is as shown below:

A T A N A N A R I V O

Various logic and heuristics may be used. For example, the penalty (e.g., decreasing a value calculated as described) for having a long gap may be lower than the penalty of having multiple short gaps, thus, for example, compensating for typical correlations in consecutive packet loss events in IP networks.

As discussed, any scoring function may be used without departing from the scope of the invention For example, in other embodiments, rather than maximizing a score as described above, a scoring function may decrease an initial value for each gap or mismatch identified and, if the resulting value is above a threshold then the receiver may determine that an adequate alignment has been achieved (and therefore the stream can be reconstructed for the relevant time window). If the value produced by the scoring function is below a threshold (e.g., due to many corrupted or lost packets) then the receiver may determine that the stream cannot be correctly reconstructed, and the receiver may take further action, e.g., request retransmission, choose one of the unaligned sequences, alert a user etc.

In some embodiments, the scoring functions may be automatically selected based on the type or attributes of channels 140. For example, a first set of factors and/or thresholds may be used for channels implemented over physical wires (e.g., where loss and corruption of packets are not likely) and a second set of factors and/or thresholds may be used for channels implemented over wireless infrastructure.

In some embodiments a method may automatically selected based on the type or attributes of channels 140. For example, if channels 140 are known to be relatively reliable then a match of two or three columns may suffice for receiver 120 to determine a correct packet was found, however, if channels 140 are known to be unreliable then receiver 120 may require four or five matching packets. Accordingly, an embodiment may automatically adjust or select a logic for reconstructing streams based on attributes of the communication channels used.

In another case, if it is known (e.g., based on the infrastructure used) that packets can be lost or dropped, but cannot be corrupted, then the sender and receiver may automatically revert to using only 2 channels. If corruption of packets is possible then the sender and receiver may automatically select to use 3 channels. Accordingly, the number of channels 140 may be automatically selected.

Figure 2:
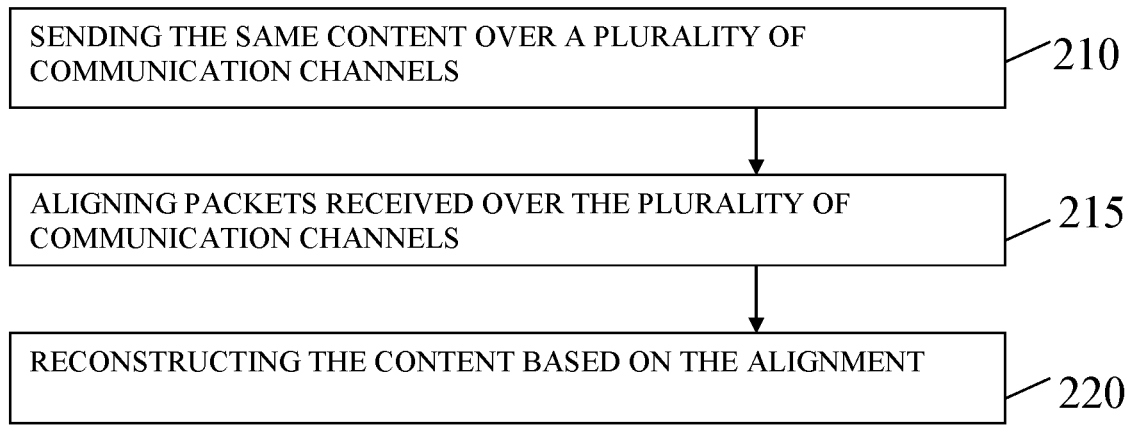
FIG. 2 shows a flowchart of a method according to illustrative embodiments of the present invention.

Reference is made to FIG. 2, a flowchart of a method according to illustrative embodiments of the present invention. As shown by block 210, the same content may be sent over a plurality of communication channels. For example, content obtained from a video camera may be divided into packets and each of the packets may be sent over several network connections. As shown by block 215, packets received may be aligned. For example, receiver 120 receives packets over a number of channels 140, arranges the received packets in a matrix and performs shifts or other operations until an optimal alignment is achieved. In some embodiments, aligning may include simply arranging or placing packets in a matrix as described and determining a level of alignment exhibited by the packets. As shown by block 220, content sent over the channels as described may be reconstructed based on the alignment. For example, packets to be included in a reconstructed stream may be selected based on an alignment of packets in a matrix as described.

Descriptions of embodiments of the invention in the present application are provided by way of example and are not intended to limit the scope of the invention. While certain features of the invention have been illustrated and described herein, many modifications, substitutions, changes, and equivalents may occur to those skilled in the art. Various embodiments have been presented. Each of these embodiments may of course include features from other embodiments presented, and embodiments not specifically described may include various features described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method comprising:
receiving a plurality of duplicates of a serial bit stream, wherein said serial bit stream comprises a sequence of data packets;
continuously dividing each of said duplicates of said serial bit stream based on sequential time windows;
with respect to each of said time windows, aligning said data packets associated with each of said duplicates of said serial bit stream, received within said time window, based, at least in part, on data packet similarity; and
recreating in real time said serial bit stream by selecting at least one of said aligned data packets as representing a next data packet in said sequence of data packets,
wherein said data packet similarity is determined based, at least in part, on a comparison of data packet content, wherein said data packet content is represented by a hash function.

2. The method of claim 1, wherein each of said plurality of duplicates of said serial bit stream is transmitted over a different communication channel.

3. The method of claim 2, wherein each of said communication channels is selected from the group consisting of: a private IP network, a public IP network, the internet, a global system for mobile communications (GSM) network, a local area network (LAN), a metropolitan area network (MAN), a wide area network (WAN), a wireless network, a satellite communication network, a cellular communication network, a Bluetooth communication channel, and a Wi-Fi network.

4. The method of claim 1, wherein said aligning comprises arranging said data packets, received within a time window, in columns of an alignment score matrix, based, at least in part, on said data packet similarity, wherein each row in said matrix represents one of said duplicates of said serial bit stream.

5. The method of claim 4, further comprising assigning an alignment score to each of said columns based on one of data packet gaps and data packet mismatches in said column.

6. The method of claim 4, wherein, with respect to each column of said matrix, said selecting is based, at least in part, on a consensus determined by data packet similarity of a majority of data packets in said column.

7. A system comprising:
at least one hardware processor; and
a non-transitory computer-readable storage medium having program code embodied therewith, the program code executable by said at least one hardware processor to:
receive a plurality of duplicates of a serial bit stream, wherein said serial bit stream comprises a sequence of data packets,
continuously divide each of said duplicates of said serial bit stream based on sequential time windows,
with respect to each of said time windows, align said data packets associated with each of said duplicates of said serial bit stream, received within said time window, based, at least in part, on data packet similarity, and
recreate in real time said serial bit stream by selecting at least one of said aligned data packets as representing a next data packet in said sequence of data packets,
wherein said data packet similarity is determined based, at least in part, on a comparison of data packet content, wherein said data packet content is represented by a hash function.

8. The system of claim 7, wherein each of said plurality of duplicates of said serial bit stream is transmitted over a different communication channel.

9. The system of claim 8, wherein each of said communication channels is selected from the group consisting of: a private IP network, a public IP network, the internet, a global system for mobile communications (GSM) network, a local area network (LAN), a metropolitan area network (MAN), a wide area network (WAN), a wireless network, a satellite communication network, a cellular communication network, a Bluetooth communication channel, and a Wi-Fi network.

10. The system of claim 7, wherein said aligning comprises arranging said data packets, received within a time window, in columns of an alignment score matrix, based, at least in part, on said data packet similarity, wherein each row in said matrix represents one of said duplicates of said serial bit stream.

11. The system of claim 10, wherein said instructions are further executable to assign an alignment score to each of said columns based on one of data packet gaps and data packet mismatches in said column.

12. The system of claim 11, wherein, with respect to each column of said matrix, said selecting is based, at least in part, on a consensus determined by data packet similarity of a majority of data packets in said column.

13. A computer program product comprising a non-transitory computer-readable storage medium having program instructions embodied therewith, the program instructions executable by at least one hardware processor to:
receive a plurality of duplicates of a serial bit stream, wherein said serial bit stream comprises a sequence of data packets;
continuously divide each of said duplicates of said serial bit stream based on sequential time windows;
with respect to each of said time windows, align said data packets associated with each of said duplicates of said serial bit stream, received within said time window, based, at least in part, on data packet similarity; and
recreate in real time said serial bit stream by selecting at least one of said aligned data packets as representing a next data packet in said sequence of data packets,
wherein said data packet similarity is determined based, at least in part, on a comparison of data packet content, wherein said data packet content is represented by a hash function.

14. The computer program product of claim 13, wherein each of said plurality of duplicates of said serial bit stream is transmitted over a different communication channel selected from the group consisting of: a private IP network, a public IP network, the internet, a global system for mobile communications (GSM) network, a local area network (LAN), a metropolitan area network (MAN), a wide area network (WAN), a wireless network, a satellite communication network, a cellular communication network, a Bluetooth communication channel, and a Wi-Fi network.

15. The computer program product of claim 13, wherein said aligning comprises arranging said data packets, received within a time window, in columns of an alignment score matrix, based, at least in part, on said data packet similarity, wherein each row in said matrix represents one of said duplicates of said serial bit stream.

16. The computer program product of claim 15, wherein said instructions are further executable to assign an alignment score to each of said columns based on one of data packet gaps and data packet mismatches in said column.

17. The computer program product of claim 15, wherein, with respect to each column of said matrix, said selecting is based, at least in part, on a consensus determined by data packet similarity of a majority of data packets in said column.

* * * * *